Figure 1:
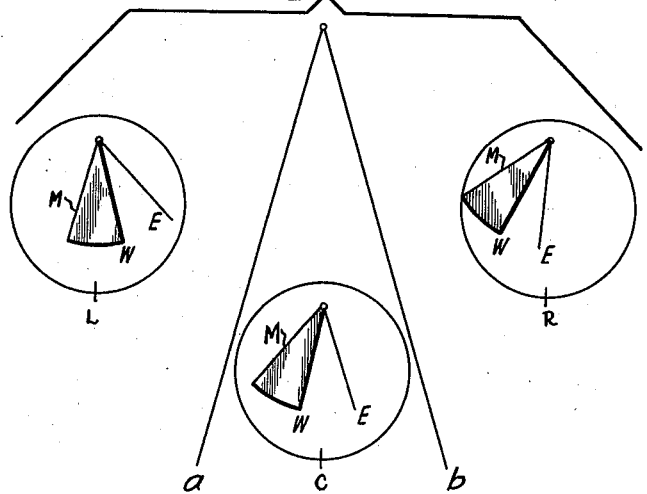

Oct. 22, 1940.  W. RUNGE  2,218,658
RADIO BEACON SYSTEM
Filed Dec. 2, 1937  2 Sheets-Sheet 1

INVENTOR
WILHELM RUNGE
BY
ATTORNEY

Oct. 22, 1940.  W. RUNGE  2,218,658

RADIO BEACON SYSTEM

Filed Dec. 2, 1937   2 Sheets-Sheet 2

INVENTOR.
WILHELM RUNGE
BY
*H. S. Srover*
ATTORNEY.

Patented Oct. 22, 1940

2,218,658

UNITED STATES PATENT OFFICE 2,218,658

RADIO BEACON SYSTEM

Wilhelm Runge, Berlin, Germany, assignor to Telefunken Gesellschaft für Drahtlose Telegraphie, m. b. H., Berlin, Germany, a corporation of Germany Application December 2, 1937, Serial No. 177,665
In Germany December 3, 1936

3 Claims. (Cl. 250—11)

It is known that a guide-ray or radio beacon course may be defined by sending out two dissimilarly directed distinguishable radiations or beams, and by observing the relationship of the field strengths of both beams in a receiver equipment. Departures from the line or zone of equi-signal strength to the right- or the left-hand side may then be told by the predominance of the one or the other receiver output volume.

More particularly speaking, it has been suggested to use for the differently directed radiations or beams the same carrier frequency, but dissimilar modulation frequencies; to pick up both beams with one and the same receiving apparatus, and to separate the different modulation frequencies at the output end of the receiver by the aid of filters, to effect rectification separately and to feed the resulting energy in differential connection to a joint instrument whose deflection to the left or the right would tell deviation from the radio beacon course in one sense or in the other.

But if for some reason or another, say, because the transmission powers of one of the filters changes, while that of the other filter stays stable, then a zero deflection of the instrument would not correspond to a position on the equi-signal line which defines the true course.

If great exactness in defining a guide-ray or beacon course is a specific desideratum, it is desirable to make available check-up means designed to demonstrate that the efficiency and operation of all circuits in the receiver which are not common to both radiations or beams, have stayed unvaried as compared with a normal state.

According to the invention this is obtained by interchanging at the transmitter the coding or modulation of both beams or radiations, and optionally by announcing at the same time by suitable means that such an inter-change has actually taken place. If the receiver is located exactly upon the beacon course, and if this is so indicated at the receiver when the modulations are as usual, then, after reversal of the codes or modulations at the sending end, the receiving indicator will again indicate an equi-signal strength condition and hence the beacon course will be unaltered. But if the receiver is located laterally in reference to the beacon course, sufficiently so that it indicates equal output volumes for both beams as a result of the circuit elements used for the stronger beam being the less effective, then, after reversal of the distinctive codes or modulations in the transmitter or beacon, the feebler beam will be much the less effective so that, while previously a true beacon course was indicated in the receiver, there will be a different indication after such reversal.

If the receiver was not in the equi-signal course or beacon course, but if the effectiveness of the circuit means for both code signals or modulations was equal, then, after reversal of codes it will show predominance of the other modulation by the same amount. The receiver is in proper working order, if, and only if, upon a check-up reversal of modulations at the transmitting end, the receiver indicating means shows a deflection unaltered in magnitude but reversed in sense. The equipment is out of order whenever the volume ratio is not only reversed, but also altered as regards its size. In case the magnitude of the indicator deflection changes upon reversal of the modulations the amount of such change is a measure of the error of the receiver indication.

The check-up reversal effected at the beacon may be announced by the aid of an auxiliary modulation of the radiated beams with an additional frequency designed to result in actuation of either audible or visible devices in the receiver designed to attract the observer's attention to the fact that a check-up transmission is taking place at the beacon station rather than the normal signal transmission.

The application of the above method of check-up to an earlier suggestion and scheme adapted to insure definition of a beacon-course sector shall here be given by way of example. The chief point in this suggested scheme was to define a sector by two separate guide rays designed to form the demarcations thereof. Each of these guide rays may be be similar to the one previously discussed. These two rays may be produced by one of the methods previously disclosed and known in the art. At the receiving end, the position of the observation point in relation to this sector is indicated by two pointers each independently actuated by one of the guide-rays and arranged in a twin-pointer type of instrument. The two pointers may be so disposed in the instrument to turn on the same axis so that they are able to move in superposition.

For the avoidance of errors in connection with the reversal for check-up, recourse may be had to the artifice of the present invention.

Figure 2:
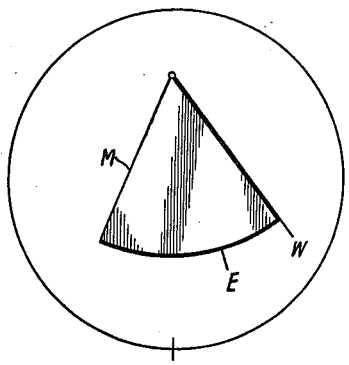
Figure 3:
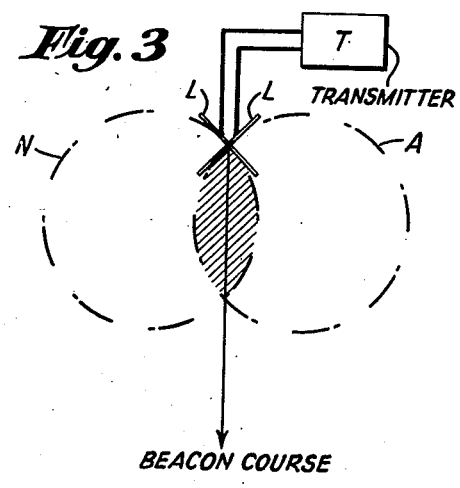
Figure 5:
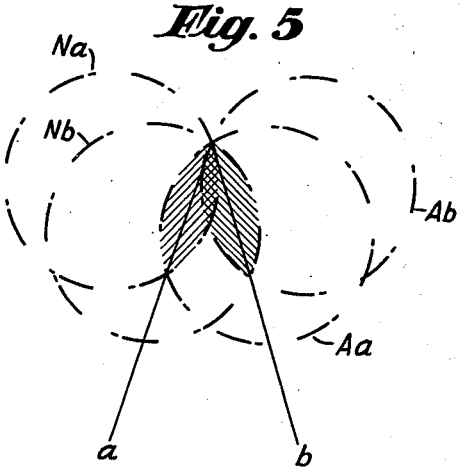
Figure 4:
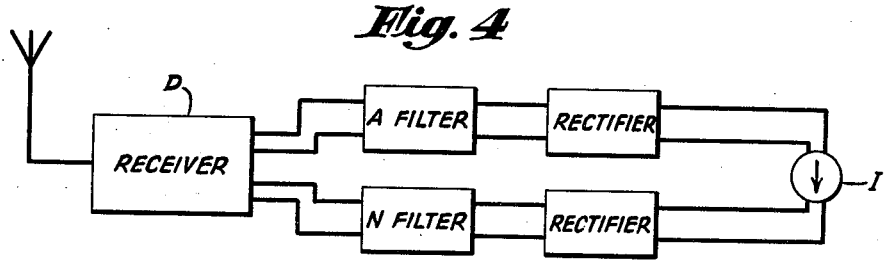

The present invention will be clearly understood by reference to the following detailed description which is accompanied by drawings in which Figure 1 shows at L, C and R typical meter indications for three positions of a receiver with respect to a beacon transmitter utilizing the present invention, while Figure 2 shows a typical meter indication upon reversing modulation for a check-up; Figure 3 shows diagrammatically a beacon signal transmitter and its resultant radiation diagrams; Figure 4 shows in block diagram form a radio beacon receiver for use with a system as shown in Figure 3; Figure 5 shows a radiation diagram for a beacon transmitter using two separate guide rays in accordance with an aspect of the present invention, and Figure 6 shows a receiver operable with a system having a radiation diagram as shown in Figure 5.

Referring, now, to Figure 3, reference letter T indicates a transmitter which is connected to a pair of crossed loops L, L. One of these loops radiates a signal which is modulated with one distinctive modulation or code in a pattern as indicated by the letter N to the left of the figure. The other loop radiates another distinctively modulated signal in a pattern as indicated by the letter A to the right of the diagram. In the overlapping radiation region along the line indicated by the legend "beacon course" the two distinctive modulations are of substantial equal intensity and a receiver of the type shown in Figure 4, picking up both these modulations will indicate that the craft carrying the receiver is on the desired course. The signals picked up by the antenna of the receiver are received, amplified and detected in a known manner in receiver D and the two distinctive modulations are separated by the A filter and the N filter. Each of these distinctive modulations are rectified and applied to a differential indicating instrument I. If only the modulation represented by the right hand circle in Figure 3 is picked up only the A filter of Figure 4 will pass any signal and the indicating pointer of instrument I will deflect in one direction. Correspondingly, if only the modulation represented by the left hand circle in Figure 3 is picked up only the N filter will pass the signal and the pointer of instrument I will be deflected in the other direction.

Figure 5 shows a duplication of two complete transmitters as shown in Figure 3. One transmitter radiates signals in a pattern represented by the circles $N_a$ and $A_a$ and indicates a beacon course along the line $a$ in the same way as heretofore described with respect to Figure 3. The other transmitter radiates signals in a pattern as indicated by circles $N_b$ and $A_b$ and indicates a beacon course along the direction of the line $b$.

Figure 6:
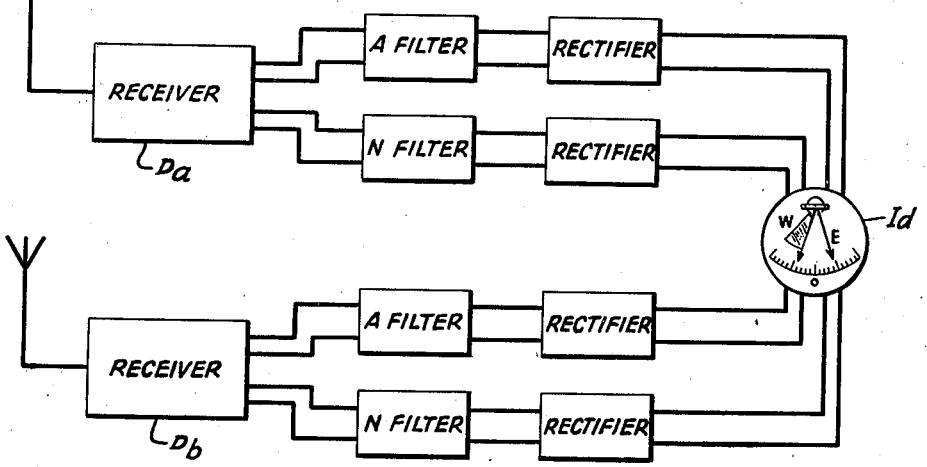

The receiver shown in Figure 6 essentially is the same as two complete receivers as shown in Figure 4. However, instead of having two separate indicating instruments I both meters are combined in a single case as shown by the reference character $I_D$. The two hands are arranged to turn on the same axis so as to be able to move in superposition over the same scale. If the receiver, as shown in Figure 6, is located along any point on line $a$ of Figure 5 the receiver $D_a$ will pick up substantial equal signals $N_a$ and $A_a$ and the meter hand W will read substantially midscale. Likewise, if the receiver is located along the line $b$ the receiver $D_b$ will pick up substantial equal signals $N_b$ and $A_b$ and the meter hand E will read substantially mid-scale. At a position midway between lines $a$ and $b$ of Figure 5 each of the meter hands E and W will deflect substantially equal amounts from the common midpoint, as shown in Figure 1 at C. Likewise, if the receiver is to the left of line $a$, the hand E will be deflected in one direction due to an increased signal $N_b$ to a very much greater extent while hand W is deflected to the same direction due to the large amplitude of signal $N_a$ as shown by Figure 1 at L. If the receiver is to the right of line $b$, the relative positions of the hands with respect to the midpoint of the scale will be reversed as shown in Figure 1 at R.

The foregoing description of the operation has been predicated upon the supposition that all of the transmitters and all of the filters of the receiver of Figure 6 are of equal efficiency. However, if one of the transmitters or one of the filters either weakens in efficiency or radiates a stronger signal the readings will be erroneous. For example, the receiver might actually be located in the mid zone between lines $a$ and $b$ and due to the previously discussed inequality the meter might indicate that the receiver was located to the right of line $a$.

According to my invention, in order to disclose this state of affairs, it is suggested that the code signals or modulations of, say, the westerly guide ray $a$ are to be interchanged and, similarly, both codes of the easterly guide ray $b$ are to be interchanged. The position of the index hands W and E will, therefore, be in a mirror picture or image relation to one another with the result that the westerly hand will be on the right hand side of the easterly one. If both pointers are so designed that the westerly hand is placed over the easterly hand and bears a cover or masking plate M on the left, as shown in the various parts of Figure 1, and in Figure 6, a pointer position as shown in Figure 2 will result upon the interchange of the modulations. The easterly pointer is in Figure 2 masked by the cover or masking plate of the westerly pointer and is no longer visible while with the standard connection of the transmitters it will always be fully open to view. In this manner conditions are made so that a reading taken while the transmitter is performing a check up can never be interpreted as meaning a reading useful for actual navigation, if it is simply kept in mind that in normal operating conditions the entire easterly pointer E must always be visible.

This invention is not confined to indications by the two modulations method, but it is, fundamentally speaking, useful for any kind of indication methods in which different circuit means are used for different codes or identification or marking signals of the variously directed beams or guide-rays.

I claim:

1. In a radio beacon course system means for radiating a pair of distinctively modulated guide rays, a receiver for said guide rays and indicating means responsive to the modulation of each of said guide rays, said indicating means comprising an indicating instrument having a pair of pointers adapted to turn on the same axis and moving over the same scale, each of said pointers being actuated by the modulation of one of said guide rays whereby a desired condition is indicated by said pointers diverging equally right and left from a midpoint on said scale and means for indicating a reversal of position of said pointers.

2. In a radio beacon course system means for radiating a pair of distinctively modulated guide rays, a receiver for said guide rays and indicating means responsive to the modulation of each of said guide rays, said indicating means comprising an indicating instrument having a pair of pointers adapted to turn on the same axis and moving over the same scale, each of said pointers being actuated by the modulation of one of said guide rays whereby a desired condition is indicated by said pointers diverging equally right and left from a midpoint on said scale and means for indicating a reversal of position of said pointers including a masking plate on one side only of one of said pointers whereby in a reversed position the other one of said pointers is hidden.

3. In a radio beacon course system means for radiating a pair of distinctively modulated guide rays, a receiver for said guide rays and indicating means responsive to the modulation of each of said guide rays, said indicating means comprising an indicating instrument having a pair of pointers adapted to turn on the same axis and moving over the same scale, each of said pointers being actuated by the modulation of one of said guide rays whereby a desired condition is indicated by said pointers diverging right and left from a midpoint on said scale and means for indicating a reversal of position of said pointers including a masking plate on one side only of one of said pointers whereby in a reversed position the other one of said pointers is hidden.

WILHELM RUNGE.